(12) United States Patent
Nishimura (10) Patent No.: US 11,322,984 B2
(45) Date of Patent: May 3, 2022

(54) COIL DEVICE

(71) Applicant: IHI Corporation, Tokyo (JP)

(72) Inventor: Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 209 days.

(21) Appl. No.: 16/492,770

(22) PCT Filed: Jul. 2, 2018

(86) PCT No.: PCT/JP2018/025053
§ 371 (c)(1),
(2) Date: Sep. 10, 2019

(87) PCT Pub. No.: WO2019/009241
PCT Pub. Date: Jan. 10, 2019

(65) Prior Publication Data
US 2020/0070673 A1 Mar. 5, 2020

(30) Foreign Application Priority Data

Jul. 5, 2017 (JP) .............................. JP2017-132036

(51) Int. Cl.
| | |
|---|---|
| *H02J 50/12* | (2016.01) |
| *H02J 50/80* | (2016.01) |
| *H02J 50/60* | (2016.01) |
| *B60L 53/12* | (2019.01) |
| *H01F 38/14* | (2006.01) |
| *H02J 5/00* | (2016.01) |
| *H04B 5/00* | (2006.01) |

(52) U.S. Cl.
CPC .............. *H02J 50/12* (2016.02); *B60L 53/12* (2019.02); *H01F 38/14* (2013.01); *H02J 5/005* (2013.01); *H02J 50/60* (2016.02); *H02J 50/80* (2016.02); *H04B 5/0037* (2013.01); *H04B 5/0081* (2013.01)

(58) Field of Classification Search
CPC ..................................................... H02J 50/12
USPC ......................................................... 320/108
See application file for complete search history.

(56) References Cited

U.S. PATENT DOCUMENTS

| | | | |
|---|---|---|---|
| 2013/0099592 | A1 | 4/2013 | Abe |
| 2013/0249477 | A1 | 9/2013 | Keeling et al. |
| 2014/0183970 | A1 | 7/2014 | Kurihara et al. |
| 2015/0367739 | A1 | 12/2015 | Boser et al. |
| 2016/0172105 | A1 | 6/2016 | Berg et al. |

(Continued)

FOREIGN PATENT DOCUMENTS

| | | |
|---|---|---|
| CN | 104870243 A | 8/2015 |
| CN | 106160268 A | 11/2016 |

(Continued)

*Primary Examiner* — Eric D Lee
(74) *Attorney, Agent, or Firm* — Volpe Koenig (57) ABSTRACT

A coil device includes a base, a cover facing the base and forming a receiving space between the base and the cover, a casing disposed inside the receiving space and containing a coil therein, a substrate disposed inside the receiving space and having a through hole passing through the substrate along a facing direction of the base and the cover, and a support portion disposed in the through hole, wherein the support portion has a strength greater than a strength of the substrate and wherein the support portion has a height greater than a thickness of the substrate.

4 Claims, 8 Drawing Sheets

(56) References Cited

U.S. PATENT DOCUMENTS

2016/0336759 A1    11/2016  Yamamoto et al.
2017/0169942 A1    6/2017  Yuasa
2017/0288469 A1*  10/2017  Murashige ............ B60L 53/126

FOREIGN PATENT DOCUMENTS

| | | |
|---|---|---|
| CN | 106856357 A | 6/2017 |
| CN | 107275044 A | 10/2017 |
| JP | 2008-017562 A | 1/2008 |
| JP | 2012-016125 A | 1/2012 |
| JP | 2014-193026 A | 10/2014 |
| JP | 2014-233107 A | 12/2014 |
| JP | 2017-188662 A | 10/2017 |
| WO | 2013/061616 A1 | 5/2013 |

* cited by examiner

Fig.8

COIL DEVICE

TECHNICAL FIELD

The present disclosure relates to a coil device.

BACKGROUND ART

For example, coil devices that are installed on a vehicle driving surface and wirelessly transmit power to vehicles are known. Such a coil device is disclosed, for example, in Patent Literature 1.

CITATION LIST

Patent Literature

Patent Literature 1: WO 2013/061616

SUMMARY OF INVENTION

Technical Problem

For example, when a tire of a vehicle rides over a coil device installed on a driving surface, a high load may be applied to the coil device. The coil device includes therein a substrate on which electronic components are mounted, and it is desired that high loads are prevented from being applied to the substrate even when, for example, a vehicle rides over the coil device.

It is thus an objective of the present disclosure to provide a coil device which is capable of preventing loads from being applied to a substrate.

Solution to Problem

A coil device according to one aspect of the present disclosure includes a base, a cover facing the base and forming a receiving space between the base and the cover, a casing disposed inside the receiving space and containing a coil therein, a substrate disposed inside the receiving space and having a through hole passing through the substrate along a facing direction of the base and the cover, and a support portion disposed in the through hole, wherein the support portion has a strength greater than a strength of the substrate, and wherein the support portion has a height greater than a thickness of the substrate.

Effects of Invention

According to one aspect of the present disclosure, loads are prevented from being applied to the substrate.

DESCRIPTION OF EMBODIMENTS

A coil device according to one aspect of the present disclosure includes a base, a cover facing the base and forming a receiving space between the base and the cover, a casing disposed inside the receiving space and containing a coil therein, a substrate disposed inside the receiving space and having a through hole passing through the substrate along a facing direction of the base and the cover, and a support portion disposed in the through hole, wherein the support portion has a strength greater than a strength of the substrate, and wherein the support portion has a height greater than a thickness of the substrate.

In this coil device, the support portion has a strength greater than that of the substrate and a height greater than the thickness of the substrate. For example, when a high load is applied on the cover toward the base, the load toward the substrate is supported by the support portion. The coil device can thus reduce the load applied to the substrate.

In the coil device, the substrate may be disposed between the cover and the casing, and the support portion may be formed by at least one of a first protrusion formed on the cover and protruding toward the casing and a second protrusion formed on the casing and protruding toward the cover. This eliminates the need to provide the support portion as a separate component and enables the number of components to be reduced. Additionally, the cover that receives external impact and the casing that contains the coil are generally formed from materials stronger than the substrate. Thus, in the coil device, at least one of the cover and the casing can also function as the support portion without the coil device being equipped with other members.

In the coil device, the substrate may be disposed between the casing and the base, and the support portion may be formed by at least one of a third protrusion formed on the casing and protruding toward the base and a fourth protrusion formed on the base and protruding toward the casing. This eliminates the need to provide the support portion as a separate component and enables the number of components to be reduced. Additionally, the casing that contains the coil and the base that receives external impact are generally formed from materials stronger than the substrate. Thus, in the coil device, at least one of the casing and the base can also function as the support portion without the coil device being equipped with other members.

In the coil device, the substrate may include a first substrate disposed between the cover and the casing, and a second substrate disposed between the casing and the base, wherein the support portion disposed in a through hole of the first substrate may be formed by at least one of a first protrusion formed on the cover and protruding toward the casing and a second protrusion formed on the casing and protruding toward the cover, and wherein the support portion disposed in a through hole of the second substrate may be formed by at least one of a third protrusion formed on the casing and protruding toward the base and a fourth protrusion formed on the base and protruding toward the casing. This eliminates the need to provide the support portion as a separate component and enables the number of components to be reduced.

In the coil device, the substrate includes a loop antenna, and the through hole is formed inside the loop antenna when viewed along the facing direction of the base and the cover. In the coil device, it is desired that various foreign objects such as metal on the cover are detected. The loop antenna is thus installed on the substrate in the coil device. Forming the through hole inside the loop antenna prevents the support portion from interfering with the loop antenna even when the loop antenna is installed.

Embodiments of the coil device according to the present disclosure are described below, with reference to the drawings, as applied to a first coil device for transmitting power in a wireless power transfer system. It should be noted that like elements are given like reference signs in the description of the drawings and redundant explanation is omitted.

Figure 1:
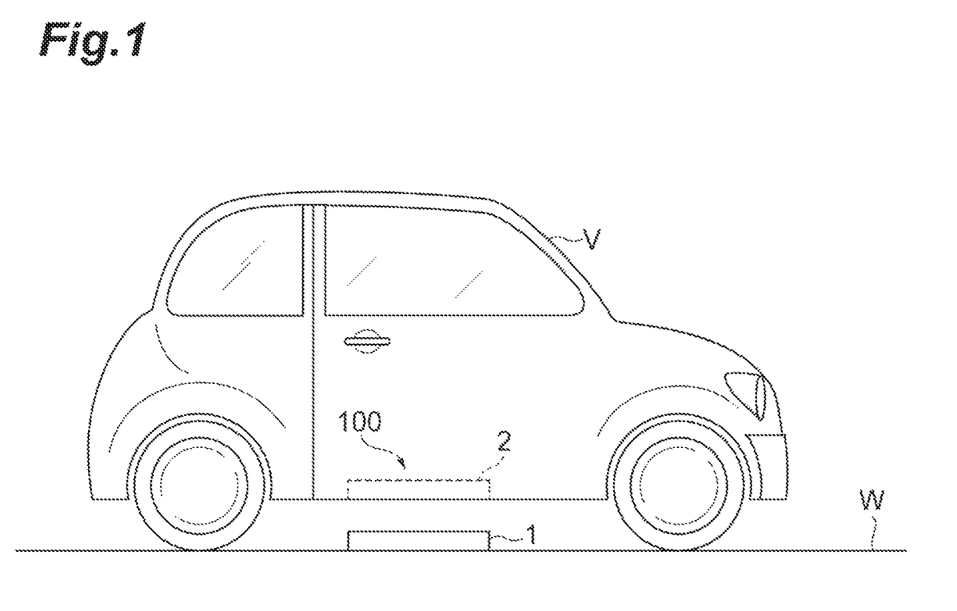
FIG. 1 A diagram showing a schematic configuration of a wireless power transfer system according to an embodiment.

As shown in FIG. 1, a wireless power transfer system 100 includes a first coil device (coil device) 1 and a second coil device 2. The first coil device 1 is installed on a road surface W on which a vehicle V travels. It should be noted that the first coil device 1 may be installed below (buried under) the road surface W. The first coil device 1 generates a magnetic field by AC power supplied from a circuit not shown. The second coil device 2 is mounted on the vehicle V which is, for example, an electric vehicle. The first coil device 1 wirelessly transmits power to the second coil device 2 of the vehicle V that has arrived at a power supply position (a position at which the first coil device 1 faces the second coil device 2), for example, using magnetic coupling between coils by magnetic resonance, electromagnetic induction, or the like. The second coil device 2 thus receives power. It should be noted that the wireless power transfer system is not limited to those using magnetic coupling, and may use, for example, electric field resonance.

Figure 2:
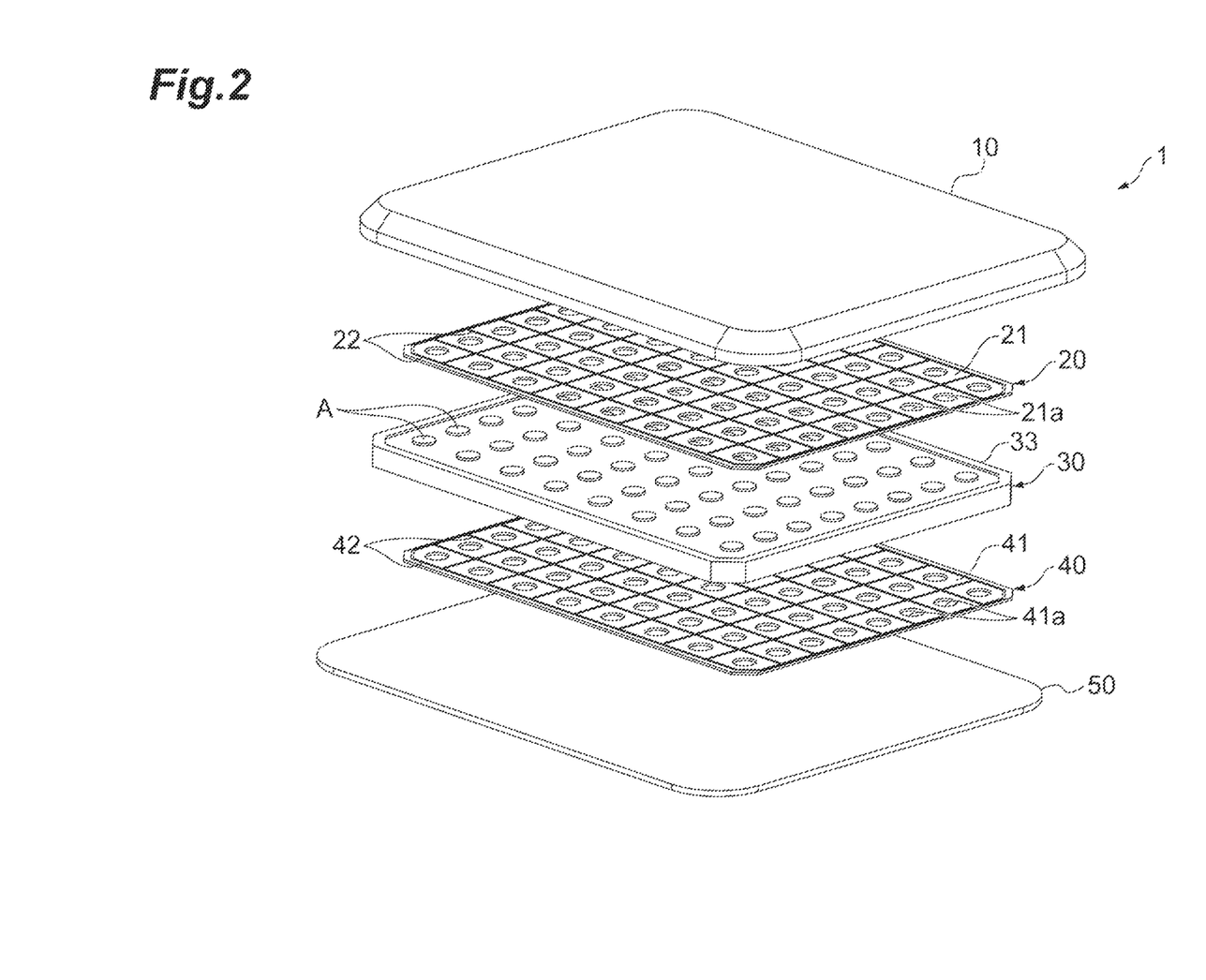
FIG. 2 An exploded view showing a configuration of a first coil device of FIG. 1.

As shown in FIG. 2, the first coil device 1 includes a cover 10, a first circuit part 20, a coil part 30, a second circuit part 40, and a base 50. The base 50 is formed, for example, from aluminum. The base 50 is installed on an installation surface provided on the road surface W. The cover 10 is disposed so as to face a top surface of the base 50 and forms a receiving space R (see FIG. 5) therebetween. The receiving space R is the space closed by the cover 10 and the base 50. The cover 10 protects the coil part 30 and other members that are contained in the receiving space R. The cover 10 is formed, for example, from a thermosetting resin.

Figure 3:
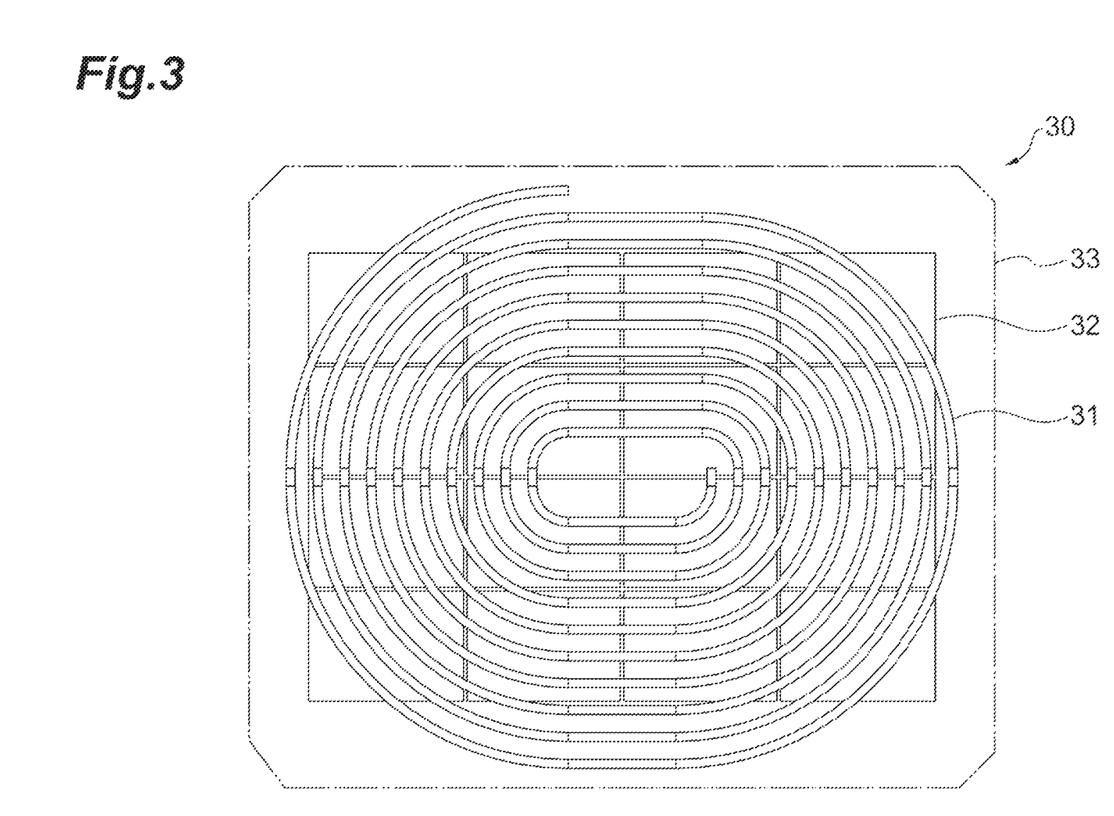
FIG. 3 A top view showing an inner configuration of a coil part of FIG. 2.

The coil part 30 is disposed inside the receiving space R. As shown in FIGS. 2 and 3, the coil part 30 includes a coil 31, a ferrite core 32, and a casing 33. The coil 31 generates a magnetic field by AC power supplied from a circuit not shown. The coil 31 is formed by a litz wire that is wound in a spiral. The ferrite core 32 is magnetic and directs and concentrates the magnetic field lines generated by the coil 31. The ferrite core 32 is disposed more toward the base 50 than the coil 31. The casing 33 contains the coil 31 and the ferrite core 32 therein. The casing 33 is formed, for example, from a PPS resin.

Figure 4:
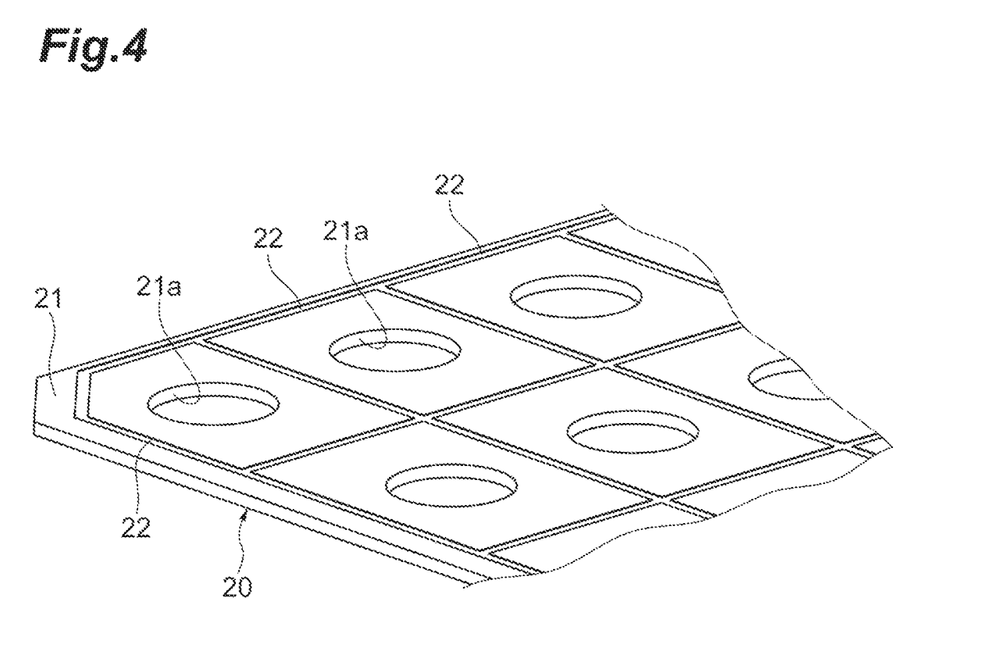
FIG. 4 An enlarged perspective view showing a first circuit part of FIG. 2.

The first circuit part 20 is disposed in the receiving space R between the cover 10 and the coil part 30. The first circuit part 20 includes various electronic components. In this embodiment, the first circuit part 20 includes a loop antenna 22 as an electronic component. Specifically, as shown in FIG. 4, the first circuit part 20 includes a first substrate (substrate) 21 and a plurality of loop antennas 22. The first substrate 21 is a member on which the electronic components (loop antennas 22) are mounted. Each loop antenna 22 is composed of an antenna line that is formed as a loop. The loop antennas 22 are mounted on a surface of the first substrate 21. The loop antennas 22 detect metallic foreign objects disposed on the first coil device 1. The loop antennas 22 are connected to a detection circuit not shown that determines whether there are any foreign objects.

The first substrate 21 has a plurality of through holes 21a. The through holes 21a pass through the first substrate 21 along a facing direction of the base 50 and the cover 10 (a direction of alignment of the base 50 and the cover 10). The through holes 21a are circular holes. The plurality of through holes 21a are arranged spaced apart from each other at predetermined intervals. The through holes 21a are disposed in positions clear of the electronic components that are mounted on the first substrate 21. In this embodiment, the through holes 21a are formed inside the loop antennas 22 when viewed along the facing direction of the base 50 and the cover 10. The loop antennas 22 of this embodiment have rectangular frame-shaped loop portions. The through holes 21a are formed inside the rectangular frame-shaped loop portions of the loop antennas 22.

In FIG. 4 and other figures, the loop antennas 22 are illustrated as lines of a grid with the loop portion of each of the loop antennas 22 surrounding the respective through holes 21a. It should be noted that the loop antennas 22 may be antennas that have only one loop portion or may be antennas in the shape of the FIG. 8 having two loop portions. The first substrate 21 is formed, for example, from a glass epoxy resin.

As shown in FIG. 2, the second circuit part 40 is disposed between the coil part 30 and the base 50 in the receiving space R. The second circuit part 40 includes various electronic components. In this embodiment, the second circuit part 40 has a configuration that is similar to that of the first circuit part 20. That is, the second circuit part 40 includes a second substrate (substrate) 41 and a plurality of loop antennas 42. Similarly to the first substrate 21, the second substrate 41 has a plurality of through holes 41a.

The through holes 41a pass through the second substrate 41 along the facing direction of the base 50 and the cover 10. The through holes 41a are circular holes. The plurality of through holes 41a are arranged spaced apart from each other at predetermined intervals. The through holes 41a are disposed in positions clear of the electronic components that are mounted on the second substrate 41. In this embodiment, the through holes 41a are formed inside the loop antennas 42 when viewed along the facing direction of the base 50 and the cover 10. The loop antennas 42 have a configuration similar to that of the loop antennas 22. The second substrate 41 is formed, for example, from a glass epoxy resin.

Figure 5:
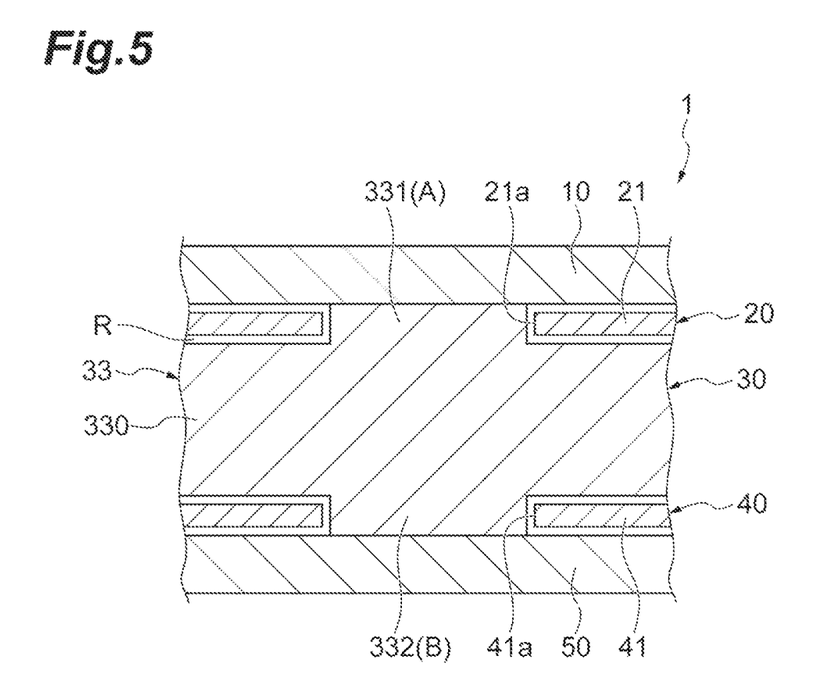
FIG. 5 A cross-sectional view showing an area around a support portion of the first coil device of FIG. 1.

As shown in FIG. 5, each through hole 21a of the first circuit part 20 has a support portion A disposed therein. Each through hole 41a of the second circuit part 40 has a support portion B disposed therein. In this embodiment, the support portions A and B are formed by portions of the casing 33. Specifically, as shown in FIG. 5, the casing 33 includes a casing body 330, a plurality of first casing protrusions 331, and a plurality of second casing protrusions 332. The casing body 330 contains the coil 31 and the ferrite core 32.

The first casing protrusions 331 are formed on a surface of the casing body 330 that faces the cover 10 and protrude from the casing body 330 toward the cover 10. The plurality of first casing protrusions 331 are formed at locations corresponding to the plurality of through holes 21a of the first substrate 21. In other words, the first casing protrusions 331 fit into the through holes 21a when the first circuit part 20 and the casing 33 are placed on top of each other. The first casing protrusions 331 are cylindrical. The first casing protrusions 331 have a protrusion height from the casing body 330 that is greater than a thickness of the first substrate 21. The first casing protrusions 331 have a strength greater than that of the first substrate 21. Distal ends of the first casing protrusions 331 in a protruding direction abut the cover 10.

In this embodiment, the support portions A are formed by the first casing protrusions 331. That is, the support portions A are formed by the first casing protrusions (second protrusions) 331 that are formed on the casing 33 and protrude toward the cover 10.

The second casing protrusions 332 are formed on a surface of the casing body 330 that faces the base 50 and protrude from the casing body 330 toward the base 50. The plurality of second casing protrusions 332 are formed at locations corresponding to the plurality of through holes 41a of the second substrate 41. In other words, the second casing protrusions 332 fit into the through holes 41a when the casing 33 and the second circuit part 40 are placed on top of each other. The second casing protrusions 332 are cylindrical. The second casing protrusions 332 have a protrusion height from the casing body 330 that is greater than a thickness of the second substrate 41. The second casing protrusions 332 have a strength greater than that of the second substrate 41. Distal ends of the second casing protrusions 332 in a protruding direction abut the base 50.

In this embodiment, the support portions B are formed by the second casing protrusions 332. That is, the support portions B are formed by the second casing protrusions (third protrusions) 332 that are formed on the casing 33 and protrude toward the base 50.

As described above, in the first coil device 1, the support portions A disposed in the through holes 21a of the first substrate 21 have a strength greater than that of the first substrate 21 and have a height greater than the thickness of the first substrate 21. Similarly, the support portions B disposed in the through holes 41a of the second substrate 41 have a strength greater than that of the second substrate 41 and have a height greater than the thickness of the second substrate 41. Thus, for example, when a tire of the vehicle V rides over the first coil device 1 and a high load is applied on the cover 10 toward the base 50, the load on the first circuit part 20 and the load on the second circuit part 40 are respectively supported by the support portions A and B. The first coil device 1 is thus capable of reducing the load applied to the first substrate 21 and the second substrate 41.

The casing 33 that contains the coil 31 and the ferrite core 32 is typically formed from a material having greater strength than the first substrate 21 and the second substrate 41. Thus, in the first coil device 1, portions of the casing 33 can also function as the support portions A and B without the first coil device 1 being equipped with other members.

In the first coil device 1, it is desired that various foreign objects such as metal on the cover 10 are detected. The loop antennas 22 are thus installed on the first substrate 21 in the first coil device 1. Forming the through holes 21a inside the loop antennas 22 prevents the support portions A from interfering with the loop antennas 22 even when the loop antennas 22 are installed. Similarly, in the second substrate 41, forming the through holes 41a inside the loop antennas 42 prevents the support portions B from interfering with the loop antennas 42.

First Variation

Figure 6:
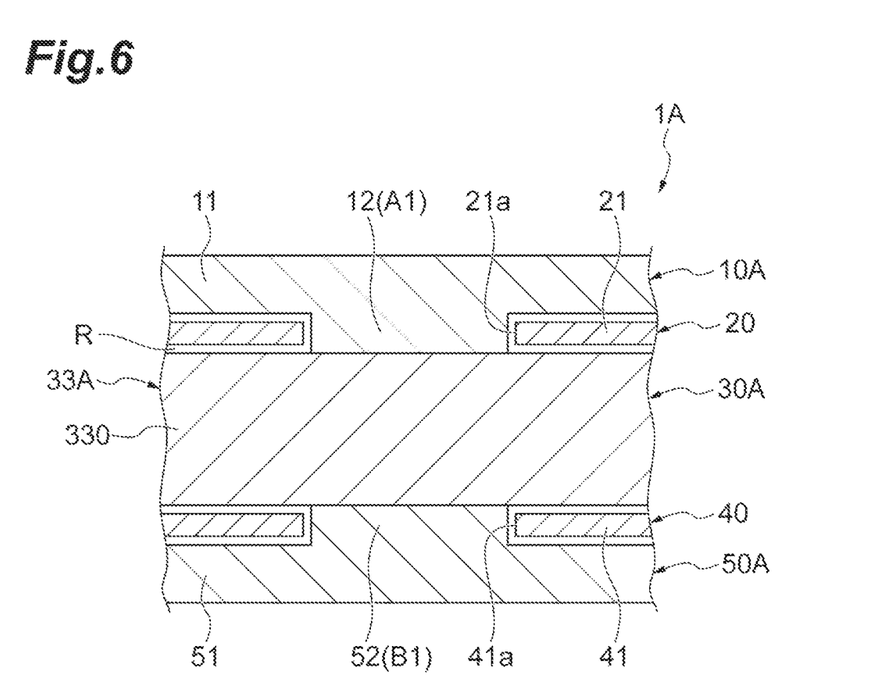
FIG. 6 A cross-sectional view showing an area around the support portion of a first variation of the first coil device.

A first variation of the support portions is described next. It should be noted that in the description below, elements similar to those of the embodiment are given the same reference signs and detailed explanation is omitted. As shown in FIG. 6, a first coil device 1A according to the first variation includes a cover 10A, a first circuit part 20, a coil part 30A, a second circuit part 40, and a base 50A.

As with the embodiment, the coil part 30A includes a coil, a ferrite core, and a casing 33A. The casing 33A has a casing body 330 that contains the coil and the ferrite core. It should be noted that the casing 33A does not have the first casing protrusions 331 and the second casing protrusions 332 of the embodiment.

The cover 10A includes a cover body 11 and a plurality of first cover protrusions 12. The cover body 11 faces the base 50A and forms a receiving space R therebetween. The first cover protrusions 12 are formed on a surface of the cover body 11 that faces the base 50A and protrude from the cover body 11 toward the base 50A. The plurality of first cover protrusions 12 are formed at locations corresponding to a plurality of through holes 21a of a first substrate 21. In other words, the first cover protrusions 12 fit into the through holes 21a when the cover 10A and the first circuit part 20 are placed on top of each other. The first cover protrusions 12 are cylindrical. The first cover protrusions 12 have a protrusion height from the cover body 11 that is greater than a thickness of the first substrate 21. The first cover protrusions 12 have a strength greater than that of the first substrate 21. Distal ends of the first cover protrusions 12 in a protruding direction abut the casing 33A.

In this embodiment, support portions A1 are formed by the first cover protrusions 12. That is, the support portions A1 are formed by the first cover protrusions (first protrusions) 12 that are formed on the cover 10A and protrude toward the casing 33A. The cover 10A is formed, for example, from a thermosetting resin.

The base 50A includes a base body 51 and a plurality of first base protrusions 52. The base body 51 faces the cover 10A and forms the receiving space R therebetween. The first base protrusions 52 are formed on a surface of the base body 51 that faces the cover 10A and protrude from the base body 51 toward the cover 10A. The plurality of first base protrusions 52 are formed at locations corresponding to a plurality of through holes 41a of a second substrate 41. In other words, the first base protrusions 52 fit into the through holes 41a when the second circuit part 40 and the base 50A are placed on top of each other. The first base protrusions 52 are cylindrical. The first base protrusions 52 have a protrusion height from the base body 51 that is greater than a thickness of the second substrate 41. The first base protrusions 52 have a strength greater than that of the second substrate 41. Distal ends of the first base protrusions 52 in a protruding direction abut the casing 33A.

In this embodiment, support portions B1 are formed by the first base protrusions 52. That is, the support portions B1 are formed by the first base protrusions (fourth protrusions) 52 that are formed on the base 50A and protrude toward the casing 33A. The base 50A is formed, for example, from aluminum.

As described above, the support portions A1 disposed in the through holes 21a of the first substrate 21 are formed by the first cover protrusions 12 of the cover 10A. In other words, in the first coil device 1A, portions of the cover 10A can function as the support portions A1. Similarly, the support portions B1 disposed in the through holes 41a of the second substrate 41 are formed by the first base protrusions 52 of the base 50A. In other words, in the first coil device 1A, portions of the base 50A can function as the support portions B1. The first coil device 1A is also capable of reducing the load applied to the first substrate 21 and the second substrate 41 in this case as with the embodiment.

Second Variation

Figure 7:
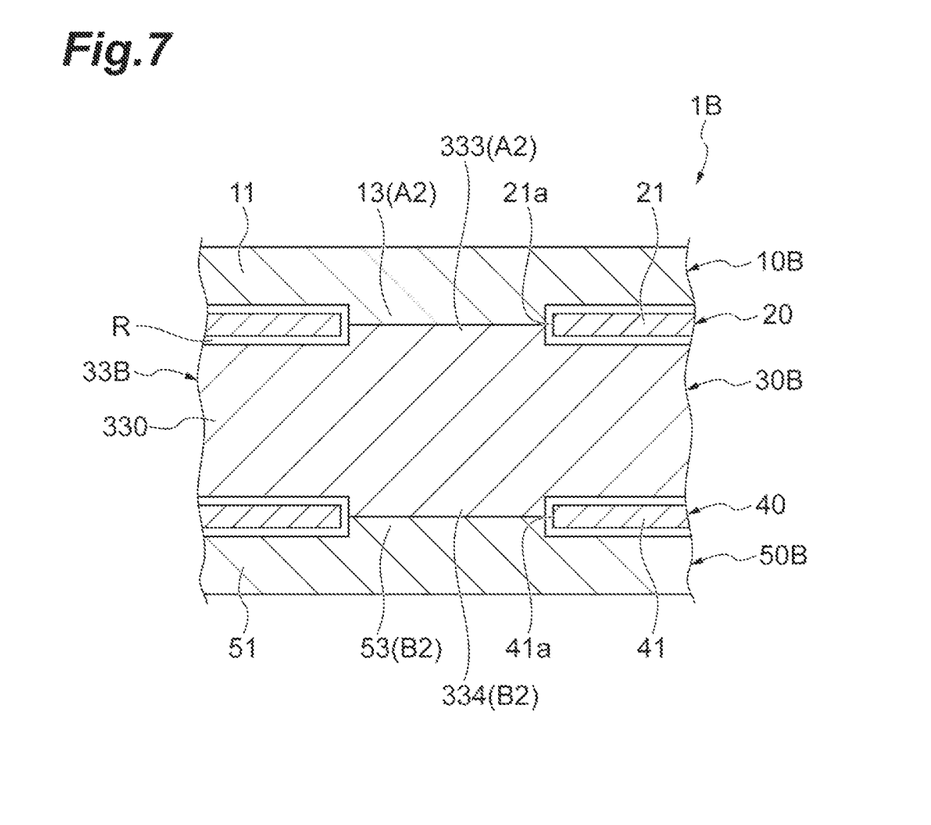
FIG. 7 A cross-sectional view showing an area around the support portion of a second variation of the first coil device.

A second variation of the support portions is described next. It should be noted that in the description below, elements similar to those of the embodiment and the variation above are given the same reference signs and detailed explanation is omitted. As shown in FIG. 7, a first coil device 1B according to the second variation includes a cover 10B, a first circuit part 20, a coil part 30B, a second circuit part 40, and a base 50B.

As with the embodiment, the coil part 30B includes a coil, a ferrite core, and a casing 33B. The casing 33B contains the coil and the ferrite core therein. The casing 33B is formed, for example, from a PPS resin. Specifically, the casing 33B includes a casing body 330, a plurality of third casing protrusions 333, and a plurality of fourth casing protrusions 334. The casing body portion 330 contains the coil and the ferrite core.

The third casing protrusions 333 are formed on a surface of the casing body 330 that faces the cover 10B and protrude from the casing body 330 toward the cover 10B. The plurality of third casing protrusions 333 are formed at locations corresponding to a plurality of through holes 21a of a first substrate 21. In other words, the third casing protrusions 333 fit into the through holes 21a when the first circuit part 20 and the casing 33B are placed on top of each other. The third casing protrusions 333 are cylindrical. The third casing protrusions 333 have a strength greater than that of the first substrate 21.

The fourth casing protrusions 334 are formed on a surface of the casing body 330 that faces the base 50B and protrude from the casing body 330 toward the base 50B. The plurality of fourth casing protrusions 334 are formed at locations corresponding to a plurality of through holes 41a of a second substrate 41. In other words, the fourth casing protrusions 334 fit into the through holes 21a when the coil part 30B and the second circuit part 40 are placed on top of each other. The fourth casing protrusions 334 are cylindrical. The fourth casing protrusions 334 have a strength greater than that of the second substrate 41.

The cover 10B includes a cover body 11 and a plurality of second cover protrusions 13. The second cover protrusions 13 are formed on a surface of the cover body 11 that faces the base 50B and protrude from the cover body 11 toward the base 50B. The plurality of second cover protrusions 13 are formed at locations corresponding to the plurality of through holes 21a of the first substrate 21. In other words, the second cover protrusions 13 fit into the through holes 21a when the cover 10B and the first circuit part 20 are placed on top of each other. The second cover protrusions 13 are cylindrical. The second cover protrusions 13 have a strength greater than that of the first substrate 21. The cover 10B is formed, for example, from a thermosetting resin.

Distal ends of the second cover protrusions 13 abut distal ends of the third casing protrusions 333. In this embodiment, support portions A2 are formed by the second cover protrusions 13 and the third casing protrusions 333. That is, the support portions A2 are formed by the second cover protrusions (first protrusions) 13 that are formed on the cover 10B and protrude toward the casing 33B and the third casing protrusions (second protrusions) 333 that are formed on the casing 33B and protrude toward the cover 10B. The support portions A2 have a height (length in the facing direction of the cover 10B and the base 50B) that is greater than a thickness of the first substrate 21.

The base 50B includes a base body 51 and a plurality of second base protrusions 53. The second base protrusions 53 are formed on a surface of the base body 51 that faces the cover 10B and protrude from the base body 51 toward the cover 10B. The plurality of second base protrusions 53 are formed at locations corresponding to the plurality of through holes 41a of the second substrate 41. In other words, the second base protrusions 53 fit into the through holes 41a when the second circuit part 40 and the base 50B are placed on top of each other. The second base protrusions 53 are cylindrical. The second base protrusions 53 have a strength greater than that of the second substrate 41. The base 50B is formed, for example, from aluminum.

Distal ends of the second base protrusions 53 abut distal ends of the fourth casing protrusions 334. In this embodiment, support portions B2 are formed by the fourth casing protrusions 334 and the second base protrusions 53. That is, the support portions B2 are formed by the fourth casing protrusions (third protrusions) 334 that are formed on the casing 33B and protrude toward the base 50B and the second base protrusions (fourth protrusions) 53 that are formed on the base 50B and protrude toward the casing 33B. The support portions B2 have a height (length in the facing direction of the cover 10B and the base 50B) that is greater than a thickness of the second substrate 41.

As described above, the support portions A2 disposed in the through holes 21a of the first substrate 21 are formed by the second cover protrusions 13 of the cover 10B and the third casing protrusions 333 of the casing 33B. In other words, in the first coil device 1B, portions of the cover 10B and portions of the casing 33B can function as the support portions A2. Similarly, the support portions B2 disposed in the through holes 41a of the second substrate 41 are formed by the fourth casing protrusions 334 of the casing 33B and the second base protrusions 53 of the base 50B. In other words, in the first coil device 1B, portions of the casing 33B and portions of the base 50B can function as the support portions B1. The first coil device 1B is also capable of reducing the load applied to the first substrate 21 and the second substrate 41 in this case as with the embodiment.

Third Variation

Figure 8:
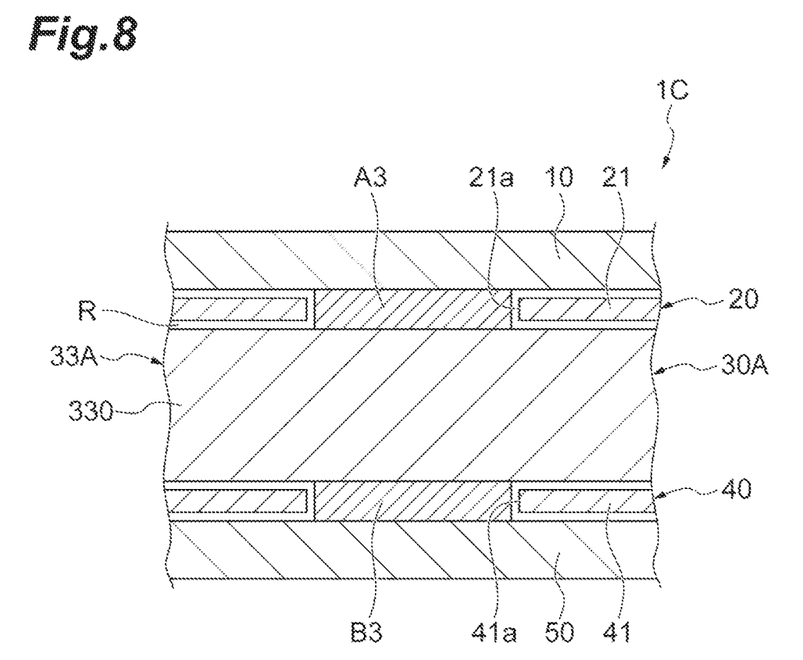
FIG. 8 A cross-sectional view showing an area around the support portion of a third variation of the first coil device.

A third variation of the support portions is described next. It should be noted that in the description below, elements similar to those of the embodiment and the variations above are given the same reference signs and detailed explanation is omitted. As shown in FIG. 8, a first coil device 1C according to the third variation includes a cover 10, a first circuit part 20, a coil part 30A, a second circuit part 40, a base 50, a plurality of support portions A3, and a plurality of support portions B3.

The support portions A3 are disposed in through holes 21a of a first substrate 21. The support portions A3 are cylindrical. The support portions A3 have a strength greater than that of the first substrate 21. The support portions A3 are formed, for example, from an insulating material having strength, such as a PC resin. The support portions A3 have a height (length in the facing direction of the cover 10 and the base 50) that is greater than a thickness of the first substrate 21.

The support portions B3 are disposed in through holes 41a of a second substrate 41. The support portions B3 are cylindrical. The support portions B3 have a strength greater than that of the second substrate 41. The support portions B3 are formed, for example, from an insulating material having strength, such as a PC resin. The support portions B3 have a height (length in the facing direction of the cover 10 and the base 50) that is greater than a thickness of the second substrate 41.

As described above, the support portions A3 and B3 are formed as members separate from the cover 10, etc. The first coil device 1C is also capable of reducing the load applied to the first substrate 21 and the second substrate 41 in this case as with the embodiment.

Although the embodiment and various variations of the present disclosure have been described above, the present disclosure is not limited thereto.

The first circuit part 20 and the second circuit part 40 are not limited to functioning as antennas that detect metallic foreign objects and may function, for example, as antennas that detect organisms or as antennas that detect the position of the second coil device 2 that faces the first coil device 1. Additionally, although the first circuit part 20 includes the loop antenna 22 as an electronic component, an element such as an integrated circuit may be mounted on the first substrate 21 as an electronic component other than the loop antenna 22. Similarly, in the second circuit part 40, an element such as an integrated circuit may be mounted on the second substrate 41 as an electronic component.

Although the support portions A, A1 to A3, B, and B1 to B3 are cylindrical, they may be formed into shapes other than cylindrical, such as square pillars. Moreover, the support portions A, etc. need not have uniform cross-sections in a height direction (facing direction of the cover 10 and the base 50). For example, the support portions A, etc. may have tapered shapes in which the cross-sections thereof are smaller toward the cover 10 or toward the base 50.

Although the first coil devices 1 and 1A to 1C include the first circuit part 20 and the second circuit part 40, they may include only one of the first circuit part 20 and the second circuit part 40.

The coil device according to the present disclosure may be applied to wireless power transfer systems for charging batteries of movable objects other than vehicles, such as underwater vessels. The coil device according to the present disclosure may also be applied to wireless power transfer systems for charging batteries of objects other than movable objects, such as consumer electronics. The coil device according to the present disclosure may also be applied to induction heating systems and eddy current flaw detection systems.

The coil device according to the present disclosure may be applied to the second coil device that receives power in the wireless power transfer system. Additionally, the first coil device described above is not limited to being installed on the road surface W and may be mounted on the vehicle V. In this case, the second coil device may be installed on the road surface W. Moreover, the first coil device and the second coil device are not limited to performing only one of power transmission or power reception, and may perform both power transmission and power reception.

The coil according to the present disclosure may be formed by a litz wire helically (three-dimensionally) wound around a ferrite core. That is, the coil may be a solenoid coil.

Industrial Applicability

The coil device of the present disclosure is capable of preventing loads from being applied to the substrate.

REFERENCE SIGNS LIST 1, 1A to 1C First coil device
2 Second coil device
10, 10A, 10B Cover
12 First cover protrusion (first protrusion)
13 Second cover protrusion (first protrusion)
21 First substrate (substrate)
21a, 41a Through hole
22, 42 Loop antenna
31 Coil
33, 33A, 33B Casing
331 First casing protrusion (second protrusion)
332 Second casing protrusion (third protrusion)
333 Third casing protrusion (second protrusion)
334 Fourth casing protrusion (third protrusion)
41 Second substrate (substrate)
50, 50A, 50B Base
52 First base protrusion (fourth protrusion)
53 Second base protrusion (fourth protrusion)
A, A1 to A3, B, B1 to B3 Support portion
R Receiving space

The invention claimed is:

1. A coil device, comprising:
   a base;
   a cover facing the base and forming a receiving space between the base and the cover;
   a casing disposed inside the receiving space and integrated with a coil therein;
   a magnetic body integrated with the casing;
   a substrate disposed inside the receiving space and having a through hole passing through the substrate along a facing direction of the base and the cover; and
   a support portion disposed in the through hole,
   wherein the support portion has a strength greater than a strength of the substrate,
   wherein the support portion has a height greater than a thickness of the substrate,
   wherein the substrate is disposed between the casing and the base, and
   the support portion is formed by at least one of a third protrusion formed on the casing and protruding toward the base and a fourth protrusion formed on the base and protruding toward the casing.

2. The coil device according to claim 1, wherein the substrate includes a loop antenna, and
   the through hole is formed inside the loop antenna when viewed along the facing direction of the base and the cover.

3. A coil device, comprising:
   a base;
   a cover facing the base and forming a receiving space between the base and the cover;
   a casing disposed inside the receiving space and integrated with a coil therein;
   a magnetic body integrated with the casing;
   a substrate disposed inside the receiving space and having a through hole passing through the substrate along a facing direction of the base and the cover; and
   a support portion disposed in the through hole,
   wherein the support portion has a strength greater than a strength of the substrate,
   wherein the support portion has a height greater than a thickness of the substrate,
   wherein the substrate includes:
      a first substrate disposed between the cover and the casing; and
      a second substrate disposed between the casing and the base,
   wherein the support portion disposed in a first through hole of the first substrate is formed by at least one of a first protrusion formed on the cover and protruding toward the casing and a second protrusion formed on the casing and protruding toward the cover, and wherein the support portion disposed in a second through hole of the second substrate is formed by at least one of a third protrusion formed on the casing and protruding toward the base and a fourth protrusion formed on the base and protruding toward the casing.

4. The coil device according to claim 3, wherein the substrate includes a loop antenna, and the first through hole and the second through hole are formed inside the loop antenna when viewed along the facing direction of the base and the cover.

\* \* \* \* \*